US012687385B2

(12) United States Patent
Hosoi

(10) Patent No.: US 12,687,385 B2
(45) Date of Patent: Jul. 21, 2026

(54) INFORMATION PROCESSING APPARATUS, INFORMATION PROCESSING METHOD, AND NON-TRANSITORY STORAGE MEDIUM

(71) Applicants: Pioneer Corporation, Tokyo (JP); Pioneer Smart Sensing Innovations Corporation, Tokyo (JP)

(72) Inventor: Kenichiro Hosoi, Kawagoe (JP)

(73) Assignees: Pioneer Corporation, Tokyo (JP); Pioneer Smart Sensing Innovations Corporation, Tokyo (JP)

( * ) Notice: Subject to any disclaimer, the term of this patent is extended or adjusted under 35 U.S.C. 154(b) by 169 days.

(21) Appl. No.: 18/282,189

(22) PCT Filed: Mar. 10, 2022

(86) PCT No.: PCT/JP2022/010513
§ 371 (c)(1),
(2) Date: Sep. 14, 2023

(87) PCT Pub. No.: WO2022/196511
PCT Pub. Date: Sep. 22, 2022

(65) Prior Publication Data
US 2024/0159514 A1 May 16, 2024

(30) Foreign Application Priority Data
Mar. 16, 2021 (JP) ................................. 2021-042241

(51) Int. Cl.
*G01B 11/02* (2006.01)
*G01B 11/14* (2006.01)

(52) U.S. Cl.
CPC ............ *G01B 11/026* (2013.01); *G01B 11/14* (2013.01)

(58) Field of Classification Search
CPC ..... G01B 11/026; G01B 11/14; G01S 7/4802; G01S 17/89; G06T 2210/56; G06T 19/00
(Continued)

(56) References Cited

U.S. PATENT DOCUMENTS 10,486,062 B2    11/2019  Ikenoue et al.
10,739,130 B2 *   8/2020  Murakami ......... G01B 11/2513
(Continued)

FOREIGN PATENT DOCUMENTS

CN         117083218 A  * 11/2023
JP       2005-127996 A     5/2005
(Continued)

OTHER PUBLICATIONS

International Search Report (with translation) and Written Opinion received in corresponding International Application No. PCT/JP2022/010513, mailed May 31, 2022, in 12 pages.
(Continued)

*Primary Examiner* — Sheree N Brown
(74) *Attorney, Agent, or Firm* — Procopio, Cory, Hargreaves & Savitch LLP

(57) ABSTRACT

An information processing apparatus (20) includes a generation unit (210). The generation unit (210) generates display data of point cloud data including position information of a plurality of data points. In addition, the generation unit (210) determines a display size of the data point to be increased as a distance from a fiducial point to the data point becomes longer. The position information included in the point cloud data is, for example, information based on a measurement result of a distance measuring apparatus, and the fiducial point indicates a position of the distance measuring apparatus. Further, for example, the distance measuring apparatus is an apparatus that emits pulsed light and that
(Continued)

receives the pulsed light reflected by a target object to measure a distance to the target object.

16 Claims, 11 Drawing Sheets

(58) Field of Classification Search
USPC ......................................................... 345/660
See application file for complete search history.

(56) References Cited

U.S. PATENT DOCUMENTS

| | | | |
|---|---|---|---|
| 2005/0071082 A1 | 3/2005 | Ohmura et al. | |
| 2007/0018099 A1* | 1/2007 | Chitturi .................. | G01B 15/08 |
| | | | 250/492.21 |
| 2015/0123995 A1* | 5/2015 | Zavodny ................. | G06T 11/60 |
| | | | 345/630 |
| 2017/0370706 A1* | 12/2017 | Nakatsukasa ............. | G06T 7/40 |
| 2018/0089536 A1* | 3/2018 | Feng ..................... | G01S 7/4808 |
| 2018/0318704 A1 | 11/2018 | Ikenoue et al. | |
| 2020/0096641 A1* | 3/2020 | Sasaki .................... | G06T 17/00 |
| 2020/0267369 A1* | 8/2020 | Nagasawa ............ | H04N 13/282 |
| 2021/0048516 A1* | 2/2021 | Rohatgi ............... | G01S 7/4972 |
| 2022/0064908 A1 | 3/2022 | Hama et al. | |
| 2023/0298241 A1 | 9/2023 | Yamanaka | |

FOREIGN PATENT DOCUMENTS

| | | | | |
|---|---|---|---|---|
| JP | 2015-210670 A | 11/2015 | | |
| JP | 2017-111515 A | 6/2017 | | |
| JP | 2019-106034 A | 6/2019 | | |
| JP | 2019-212225 A | 12/2019 | | |
| JP | 2020-131365 A | 8/2020 | | |
| JP | 6874197 B1 * | 5/2021 | ............. | G06T 13/20 |
| JP | 2022-038803 A | 3/2022 | | |
| WO | WO-2019017431 A1 * | 1/2019 | ............. | G06T 7/521 |
| WO | 2022-044755 A1 | 3/2022 | | |
| WO | WO-2022153426 A1 * | 7/2022 | ............... | G08G 1/16 |
| WO | WO-2022196511 A1 * | 9/2022 | ............. | G06T 19/00 |

OTHER PUBLICATIONS

Extended European Search Report received in EP22771262.7, dated Jan. 21, 2025, in 9 pages.
Office Action received in JP 2023-507041, dated Mar. 26, 2024, in 8 pages (with translation).

* cited by examiner

RELATIONSHIP BETWEEN
ACTUAL LIGHT IRRADIATION
REGION AND TARGET

DISPLAY ACCORDING
TO COMPARATIVE
EXAMPLE

SHIFT DISTANCE
MEASURING
APPARATUS TO
UPPER LIGHT

SHIFT DISTANCE
MEASURING
APPARATUS TO
UPPER LIGHT

ROTATE DISTANCE
MEASURING
APPARATUS
COUNTERCLOCKWISE

INFORMATION PROCESSING APPARATUS, INFORMATION PROCESSING METHOD, AND NON-TRANSITORY STORAGE MEDIUM

CROSS-REFERENCE TO RELATED APPLICATIONS

This application is a U.S. national stage application of International Application No. PCT/JP2022/010513, filed Mar. 10, 2022, which claims priority to JP 2021-042241, filed Mar. 16, 2021, the contents of which are incorporated by reference.

TECHNICAL FIELD

The present invention relates to an information processing apparatus, an information processing method, and a program.

BACKGROUND ART

In recent years, development of distance measuring apparatuses that can be used for autonomous driving of an automobile and the like has been performed. An example of the distance measuring apparatus includes a distance measuring apparatus that measures a distance to a surrounding object by measuring the time it takes for emitted light to be reflected by the object and return.

Such a measuring apparatus generates point cloud data representing a measurement result. The point cloud data represents a position of the measured object inside a three-dimensional space.

Patent Document 1 describes that, when displaying point cloud data, a size of a displayed figure is increased as it approaches viewpoint coordinates in order to facilitate the intuitive grasping of a shape and presence or absence of an object.

RELATED DOCUMENT

Patent Document

Patent Document 1: Japanese Unexamined Patent Publication No. 2015-210670

SUMMARY OF THE INVENTION

Technical Problem

Meanwhile, in a case where a distance measuring apparatus is attached to a moving object or the like, it is necessary to adjust an attachment position and an angle. In that case, it is difficult to perform adjustment work without knowing how light emitted from the distance measuring apparatus hits a specific target.

An example of the problem to be solved by the present invention is to display point cloud data to facilitate grasping of how light from a distance measuring apparatus is being irradiated.

Solution to Problem

According to the invention described in claim 1, there is provided an information processing apparatus including:

a generation unit configured to generate display data of point cloud data including position information of a plurality of data points, in which the generation unit is configured to determine a display size of the data point to be increased as a distance from a fiducial point to the data point becomes longer.

According to the invention described in claim 11, there is provided an information processing method including:

a generation step of generating display data of point cloud data including position information of a plurality of data points, in which in the generation step, a display size of the data point is determined to be increased as a distance from a fiducial point to the data point becomes longer.

According to the invention described in claim 12, there is provided a program causing a computer to execute each step of the information processing method according to claim 11.

BRIEF DESCRIPTION OF THE DRAWINGS

FIG. 9 is a diagram illustrating a computer for implementing the information processing apparatus.

FIG. 10 is a diagram showing a relationship between a spread angle $\theta$ of pulsed light, a distance D, and a spot size w of the pulsed light.

DESCRIPTION OF EMBODIMENTS

Figure 1:
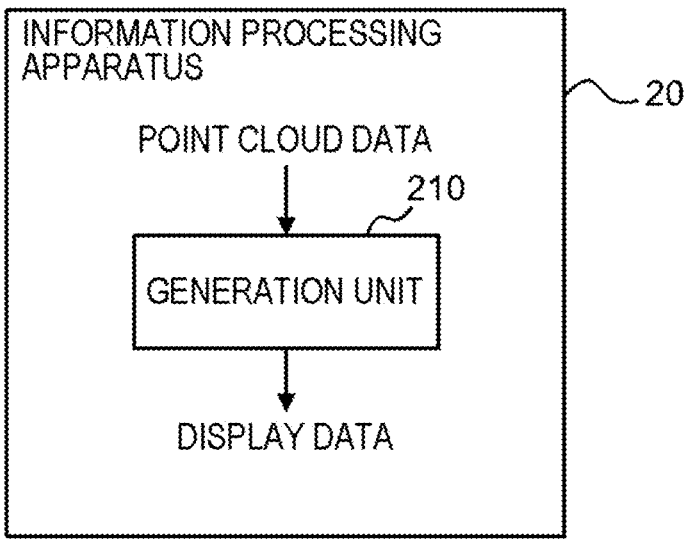
FIG. 1 is a block diagram illustrating a configuration of an information processing apparatus according to an embodiment.

Hereinafter, embodiments of the present invention will be described with reference to the drawings. In all of the drawings, the same constituent elements are designated by the same reference numerals, and the description thereof will not be repeated as appropriate.

In the following description, a generation unit 210 of an information processing apparatus 20 and a measurement control unit 17 of a distance measuring apparatus 10 are each represented as a functional block, unless otherwise specified, rather than as a configuration of a hardware unit. The generation unit 210 of the information processing apparatus 20 and the measurement control unit 17 of the distance measuring apparatus 10 are each implemented by any combination of software and hardware centering on a CPU, a memory, a program loaded in the memory, a storage medium such as a hard disk for storing the program, and an interface for network connection of any computer. There are various modification examples in an implementation method thereof and the apparatus.

(Embodiment)

FIG. 1 is a block diagram illustrating a configuration of the information processing apparatus 20 according to a first embodiment. The information processing apparatus 20 according to the present embodiment includes the generation unit 210. The generation unit 210 generates display data of point cloud data including position information of a plurality of data points. In addition, the generation unit 210 determines the display size of the data point to be increased as a distance from a fiducial point to the data point becomes longer. The details will be described below.

Figure 2:
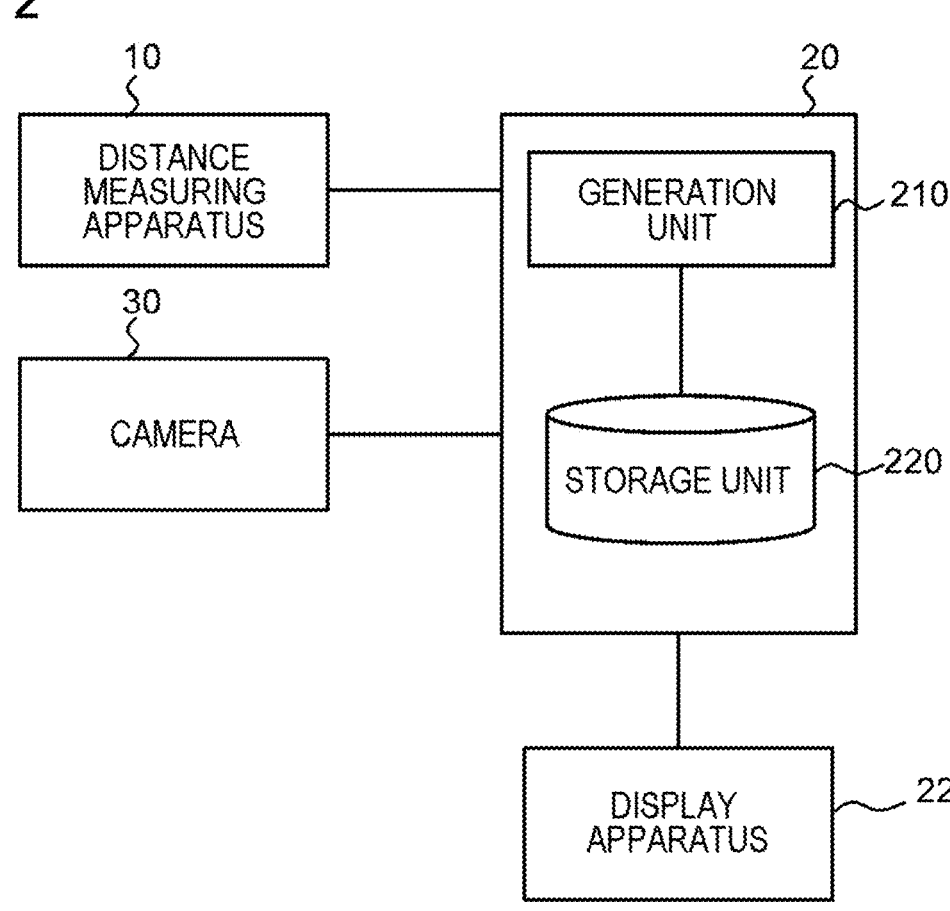
FIG. 2 is a diagram illustrating a usage environment of the information processing apparatus according to the embodiment.

FIG. 2 is a diagram illustrating a usage environment of the information processing apparatus 20 according to the present embodiment. In the present embodiment, the position information included in the point cloud data is information based on a measurement result of the distance measuring apparatus 10. The fiducial point indicates the position of the distance measuring apparatus 10. In addition, the distance measuring apparatus 10 is an apparatus that emits pulsed light and that receives the pulsed light reflected by a target object to measure a distance to the target object. Although this diagram shows an example in which the information processing apparatus 20 is provided as a separate apparatus from the distance measuring apparatus 10, the information processing apparatus 20 may be a part of the distance measuring apparatus 10.

Figure 3:
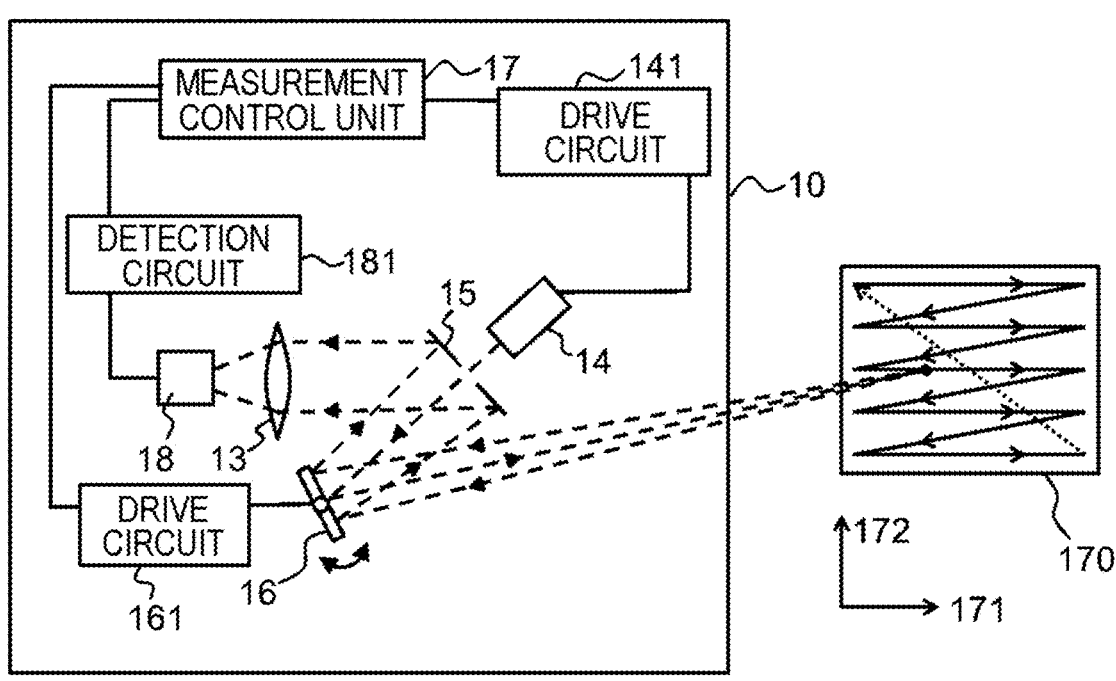
FIG. 3 is a diagram illustrating a configuration of a distance measuring apparatus according to the embodiment.

FIG. 3 is a diagram illustrating a configuration of the distance measuring apparatus 10 according to the present embodiment. In this diagram, dashed arrows indicate paths of light. The distance measuring apparatus 10 will be described in detail with reference to this diagram. In the example of this diagram, the distance measuring apparatus 10 includes a condenser lens 13, a light emitting element 14, a perforated mirror 15, a movable mirror 16, the measurement control unit 17, a light receiving element 18, a drive circuit 141, a drive circuit 161, and a detection circuit 181.

The distance measuring apparatus 10 is an apparatus that measures a distance from the distance measuring apparatus 10 to an object (target object) located within a scanning range 170 based on, for example, a difference between an emission timing of pulsed light and a light reception timing of reflected light (reflected pulsed light). The pulsed light is light such as infrared light, for example. In addition, the pulsed light is, for example, a laser pulse. The pulsed light that is output from the light emitting element 14 provided in the distance measuring apparatus 10 and that is emitted to the outside of the distance measuring apparatus 10 is reflected by the object, and at least a part thereof returns toward the distance measuring apparatus 10. Then, the reflected light is incident on the distance measuring apparatus 10. The reflected light incident on the distance measuring apparatus 10 is received by the light receiving element 18 and the intensity thereof is detected. Here, the distance measuring apparatus 10 measures the time from when the pulsed light is emitted from the light emitting element 14 to when the reflected light is detected by the light receiving element 18. Then, the measurement control unit 17 calculates the distance between the distance measuring apparatus 10 and the object using the measured time and the propagation speed of the pulsed light. The distance measuring apparatus 10 is, for example, a laser imaging detection and ranging or laser illuminated detection and ranging (LIDAR) apparatus or a light detection and ranging (Li-DAR) apparatus.

The light emitting element 14 emits pulsed light. The light emitting element 14 is, for example, a laser diode. The drive circuit 141 is a circuit for causing the light emitting element 14 to emit light by generating a drive signal based on a control signal from the measurement control unit 17 and includes, for example, a switching circuit and a capacitance element.

The light receiving element 18 receives the pulsed light incident on the distance measuring apparatus 10. The light receiving element 18 is a photodiode such as an avalanche photodiode (APD), for example. The detection circuit 181 includes an I-V converter and an A/D conversion circuit and outputs a signal indicating the detected intensity of light by the light receiving element 18.

The movable mirror 16 is, for example, a uniaxially movable or biaxially movable MEMS mirror. The drive circuit 161 generates a drive signal for driving the movable mirror 16 based on a control signal from the measurement control unit 17. By changing a direction of a reflecting surface of the movable mirror 16 using the drive signal, the emission direction of the pulsed light emitted from the distance measuring apparatus 10 can be changed. In a case where the movable mirror 16 is a biaxially movable MEMS mirror, a raster scan can be performed within a predetermined range with pulsed light by biaxially driving the movable mirror 16.

The measurement control unit 17 generates point cloud data including measurement results using a plurality of pulsed light. For example, in a case where a raster scan is performed within the scanning range 170, a linear scan is performed by changing the emission direction of light to a first direction 171. The point cloud data including a plurality of measurement results within the scanning range 170 can be generated by performing a plurality of linear scans while changing the emission direction of light to a second direction 172. In the example of this diagram, the first direction 171 and the second direction 172 are orthogonal to each other.

A unit of the point cloud data generated by one raster scan is called a frame. After the measurement for one frame is completed, the emission direction of light returns to an initial position, and the measurement for the next frame is performed. In this manner, frames are repeatedly generated. In the point cloud data, a distance measured using pulsed light is associated with information indicating the emission direction of the pulsed light. Alternatively, the point cloud data may include three-dimensional coordinates indicating a reflection point of the pulsed light. The measurement control unit 17 generates the point cloud data using the calculated distance and information indicating the angle of the movable mirror 16 at the time of each pulsed light emission. The generated point cloud data may be output to the outside of the distance measuring apparatus 10 or may be held in a storage device accessible by the measurement control unit 17.

The pulsed light output from the light emitting element 14 passes through a hole of the perforated mirror 15, is reflected by the movable mirror 16, and then is emitted from the distance measuring apparatus 10. In addition, reflected light incident on the distance measuring apparatus 10 is reflected by the movable mirror 16 and the perforated mirror 15, and then is incident on the light receiving element 18 through the condenser lens 13. The distance measuring apparatus 10 may further include a collimating lens, a mirror, and the like.

The measurement control unit 17 controls the light emitting element 14, the light receiving element 18, and the movable mirror 16. Further, the measurement control unit 17 receives the light reception signal from the detection circuit 181 and calculates the distance from the distance measuring apparatus 10 to the object within the scanning range 170 as described above. Note that the configuration of the distance measuring apparatus 10 is not limited to the example of this diagram.

Figure 4:
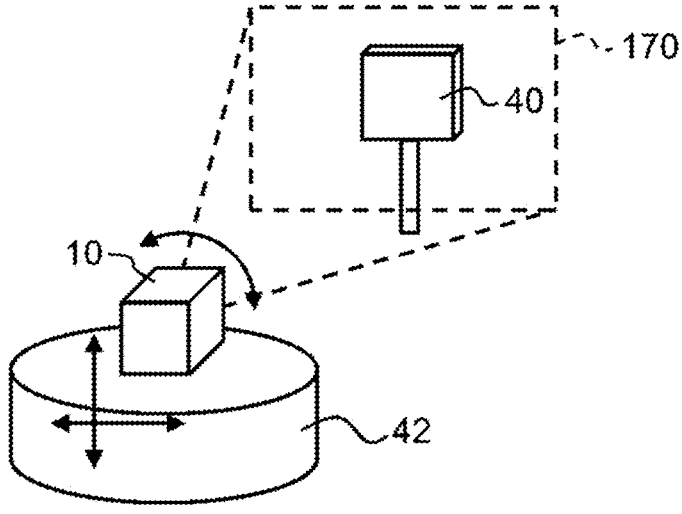
FIG. 4 is a diagram illustrating a state in which a position and an angle of the distance measuring apparatus are adjusted using a target.

FIG. 4 is a diagram illustrating a state in which a position and an angle of the distance measuring apparatus 10 are adjusted using a target 40. For example, the distance measuring apparatus 10 is mounted in a moving object such as a vehicle. When attaching the distance measuring apparatus 10 to an attachment target object 42 such as a moving object, adjustment work to the attachment position and the attachment angle of the distance measuring apparatus 10 with respect to the attachment target object 42 is required in order to measure a desired region. For example, the distance measuring apparatus 10 is adjusted such that the target 40 disposed at a predetermined position with respect to the attachment target object 42 can be appropriately measured. In the adjustment work, it is necessary to display the point cloud data obtained by the distance measuring apparatus 10 and grasp the positional relationship between the scanning range 170 of the distance measuring apparatus 10 and the target 40. As will be described below in detail, the generation unit 210 generates display data for superimposing and displaying an image captured by a camera and the plurality of data points. The user can perform the adjustment work of the distance measuring apparatus 10 while viewing the image displayed using such display data.

The adjustment elements for the position and the angle of the distance measuring apparatus 10 include positions in three-axis directions orthogonal to each other (a vertical direction, a horizontal direction, and a sensing direction) and rotation angles about these three axes. Here, the degree of freedom of adjustment of the distance measuring apparatus 10 is not necessarily limited to using these six elements. For example, only some of these six elements may be used for the degree of freedom of adjustment of the distance measuring apparatus 10. In addition, arrows shown in this diagram are examples of adjustment elements, and the adjustment of the distance measuring apparatus 10 is not limited to the example of this diagram.

As a comparative example of the display method of the point cloud data, there is a method of displaying each point included in the point cloud data as a mark having the same predetermined size.

Figure 5:
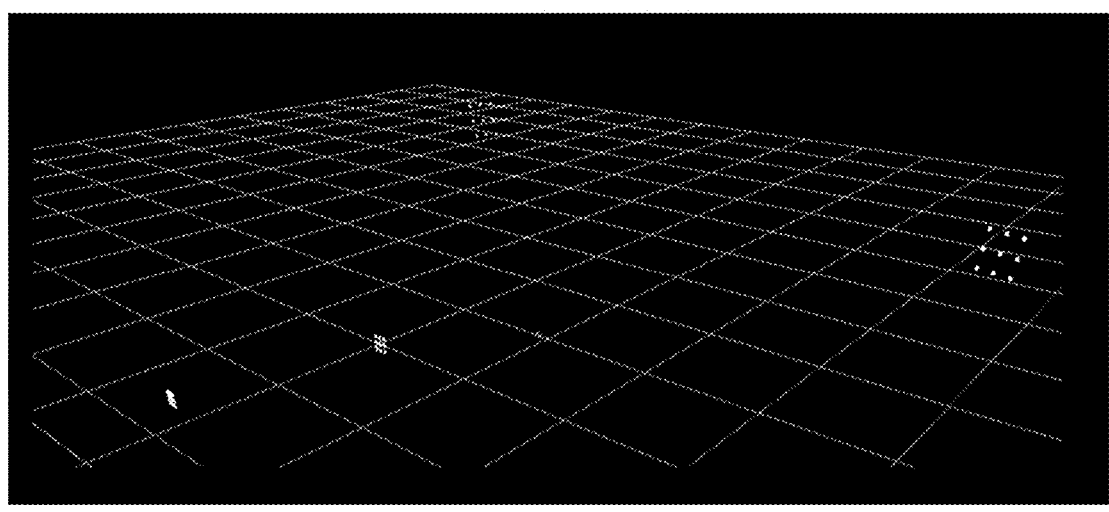
FIG. 5 is a diagram showing an example of point cloud data displayed through a method of a comparative example.

FIG. 5 is a diagram showing an example of the point cloud data displayed through the method of the comparative example. In this diagram, the position of the distance measuring apparatus that has acquired this point cloud data is located at the lower left of the diagram. As shown in this diagram, the farther away from the distance measuring apparatus is, the larger the interval between measurement points, that is, the distance interval between the data points in the point cloud data, is. Meanwhile, since the displayed marks have all the same size, the farther away from the distance measuring apparatus is, the coarser the display of the marks becomes.

Figure 6:
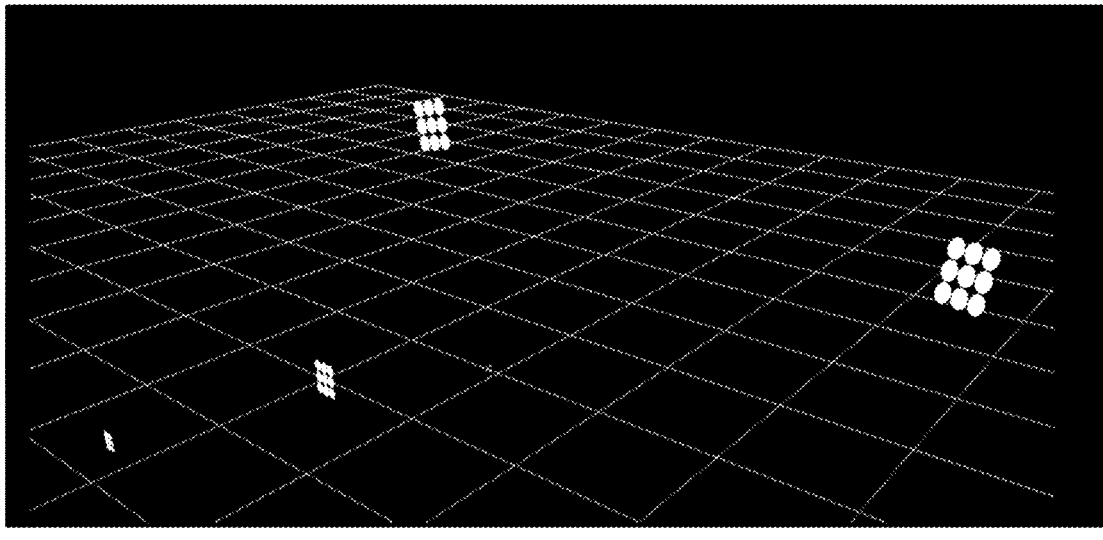
FIG. 6 is a diagram showing a display example of point cloud data according to the embodiment.

FIG. 6 is a diagram showing a display example of the point cloud data according to the present embodiment. The display example of the point cloud data according to the present embodiment is an example of an image displayed using the display data generated by the information processing apparatus 20 according to the present embodiment. In this diagram, the position of the distance measuring apparatus 10 that has acquired this point cloud data is also located at the lower left of the diagram. In this example as well, the farther away from the distance measuring apparatus is, the larger the center interval between measurement points, that is, the center distance interval between the data points in the point cloud data, is. On the other hand, however, the display size of the data point increases as the distance from the distance measuring apparatus increases. Actually, since the spot of the pulsed light becomes larger as the distance from the distance measuring apparatus 10 increases, the light irradiation region of each pulsed light becomes larger. Therefore, it can be said that the example of FIG. 6 more accurately represents the light irradiation region by the actual pulsed light compared to the example of FIG. 5.

Figure 7:
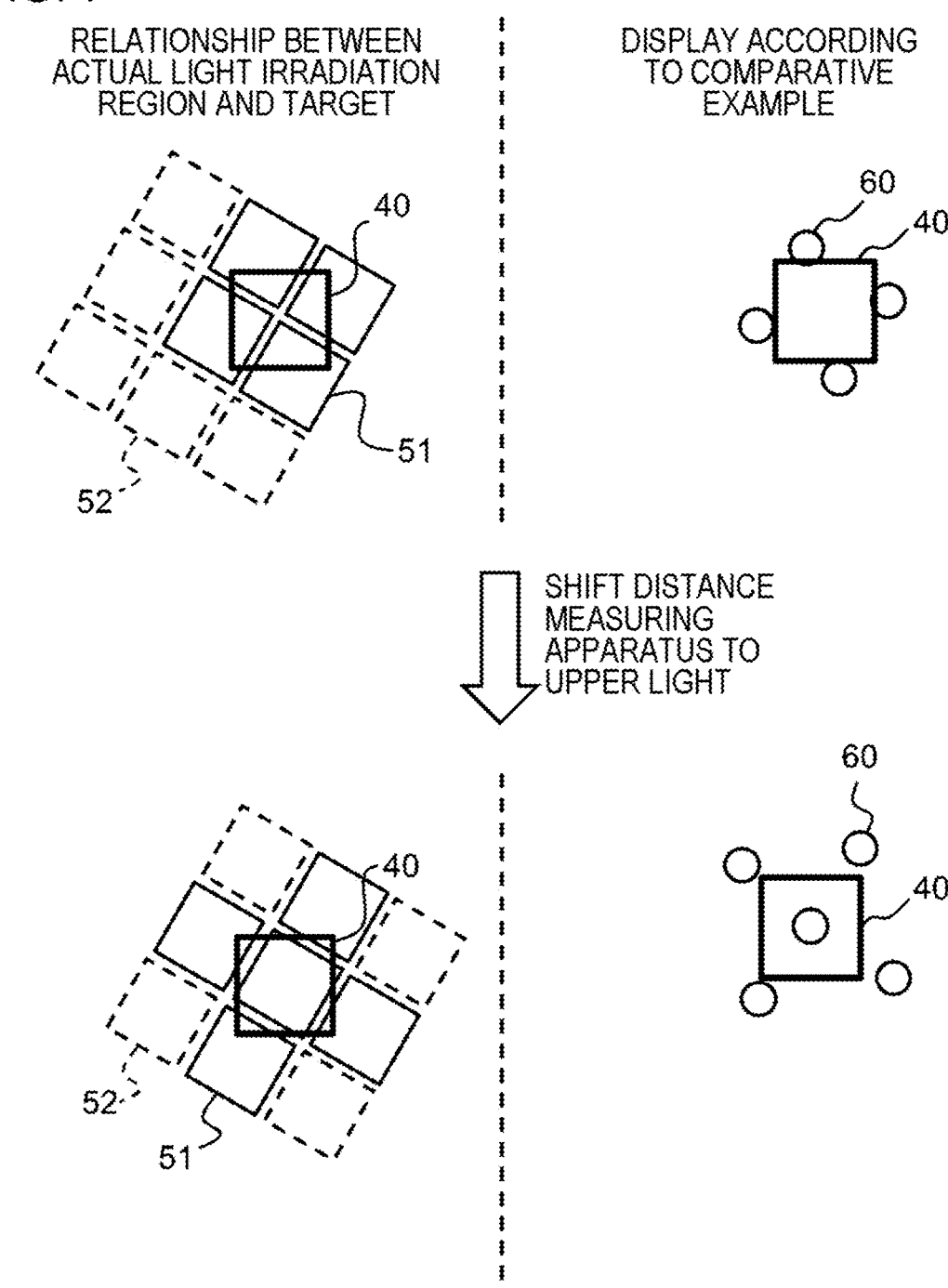
FIG. 7 is a diagram showing an example of a relationship between a light irradiation region and a target, and a display example of the point cloud data according to the comparative example.

FIG. 7 is a diagram showing an example of a relationship between a light irradiation region 51 and the target 40, and a display example of the point cloud data according to the comparative example. In the measurement by the distance measuring apparatus, the actual spot shape of the pulsed light is, for example, a rectangle as shown on the left side of this diagram. In the example of this diagram, the light irradiation regions 51 overlap the target 40. That is, this is a state in which the target 40 is irradiated with pulsed light and the reflected light is detected. A part of each light irradiation region 51 protrudes from the target 40. However, in a case where a part of the light is reflected and detected by the distance measuring apparatus 10, distance measurement is performed, and the target 40 appears as the measured data point. In this diagram, non-reflective regions 52 where the pulsed light is emitted but does not hit the target 40 and no reflected light is detected are indicated by dashed rectangles.

In addition, in the display example according to the comparative example on the right side of this diagram, the image of the target 40 is displayed in conformity with a plurality of marks 60 indicating data points. In the display example according to the comparative example, the marks 60 are coarse and the gaps between the marks 60 are displayed larger than the actual gaps between the light irradiation regions 51. Since the mark 60 reflects only the position of the light irradiation region 51, the target 40 is displayed on the gap between the mark 60 and the mark 60 in the state shown in the upper side of this diagram. When viewing this display, it intuitively gives an impression that the pulsed light barely hits the target 40, and there is a significant deviation from the actual situation.

Further, when the distance measuring apparatus is shifted to the upper right and one pulsed light is emitted to substantially the center of the target 40, the state shown in the lower side of this diagram is obtained. Actually, in addition to the central pulsed light, a part of the pulsed light emitted around 40 is reflected by 40 and detected. In this state, in the display example according to the comparative example, the mark 60 is displayed at a position deviated from the target 40, and it is difficult to intuitively grasp the actual irradiation situation of the pulsed light.

Figure 8:
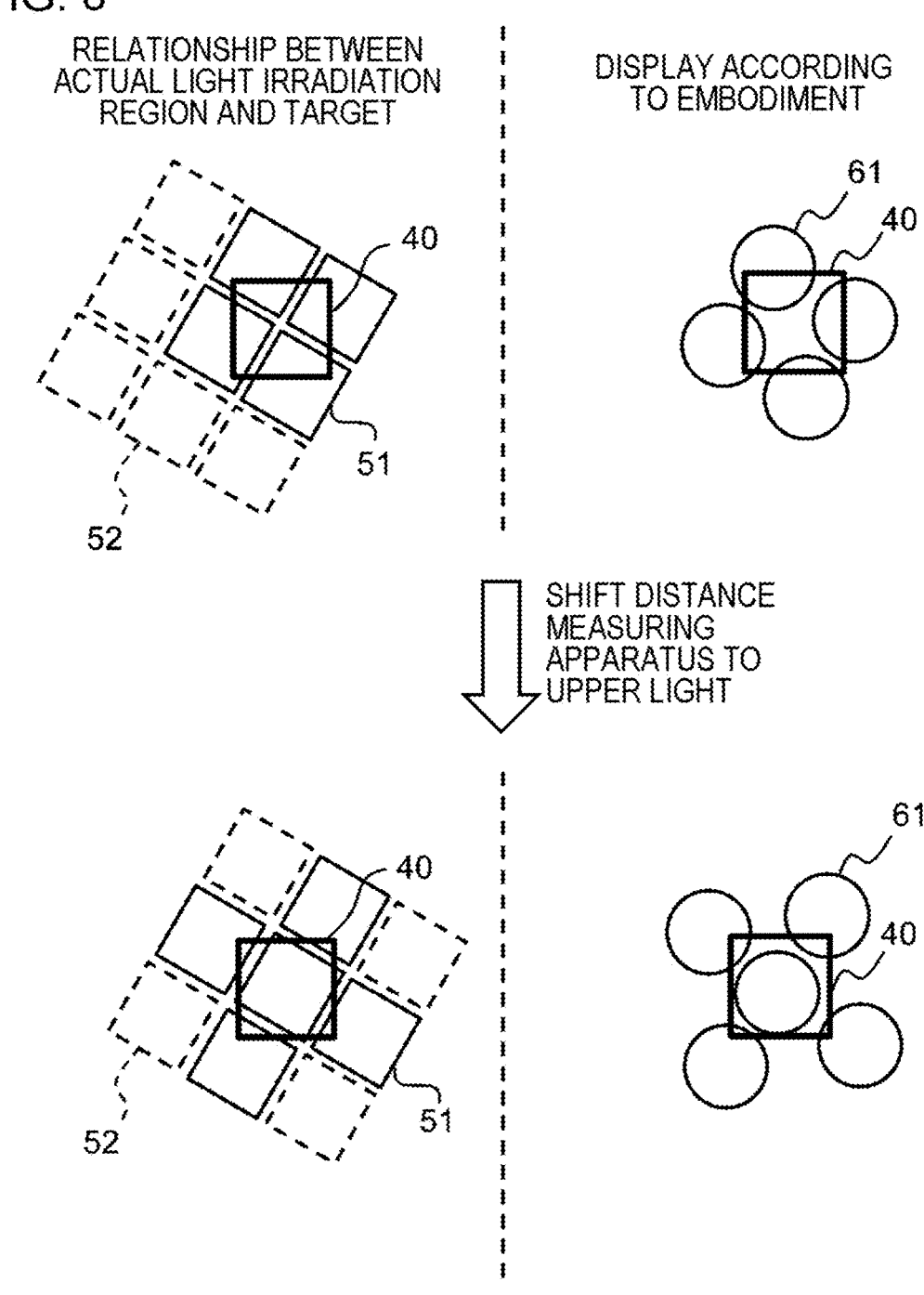
FIG. 8 is a diagram showing an example of a relationship between the light irradiation region and the target, and a display example of the point cloud data according to the embodiment.

FIG. 8 is a diagram showing an example of a relationship between the light irradiation region 51 and the target 40, and a display example of the point cloud data according to the present embodiment. The relationship between the light irradiation region 51 and the target 40 is the same as in FIG. 7. In the display example according to the present embodiment shown in this diagram, the image of the target 40 is displayed in conformity with a plurality of marks 61 indicating data points. In the display example according to the present embodiment, the mark 61 is displayed in a size corresponding to the distance from the fiducial point. That is, since the measurement result of the distant target 40 is displayed with the large marks 61, the size of the gap between the marks 61 corresponds to the size of the actual gap between the light irradiation regions 51. In other words, the display area size of the mark corresponds to the area size of the actual light irradiation region. Therefore, it is easy to intuitively grasp the actual relationship between the target 40 and the light irradiation region 51 from the relationship between the target 40 and the mark 61. In the example on the lower side of this diagram showing a state after the distance measuring apparatus 10 is moved to the upper right, it can also be grasped that a part of the pulsed light is reflected by the target 40 in the display example according to the present embodiment.

The information processing apparatus 20 according to the present embodiment will be described in detail below.

A hardware configuration of the information processing apparatus 20 will be described below. Each functional configuration unit of the information processing apparatus 20 may be implemented using hardware (for example, a hard-wired electronic circuit or the like) that implements each functional configuration unit, or may be implemented using a combination of hardware and software (for example, a combination of an electronic circuit and a program for controlling the electronic circuit, or the like). Hereinafter, a case where each functional configuration unit of the information processing apparatus 20 is implemented using a combination of hardware and software will be further described.

Figures 9, 10:
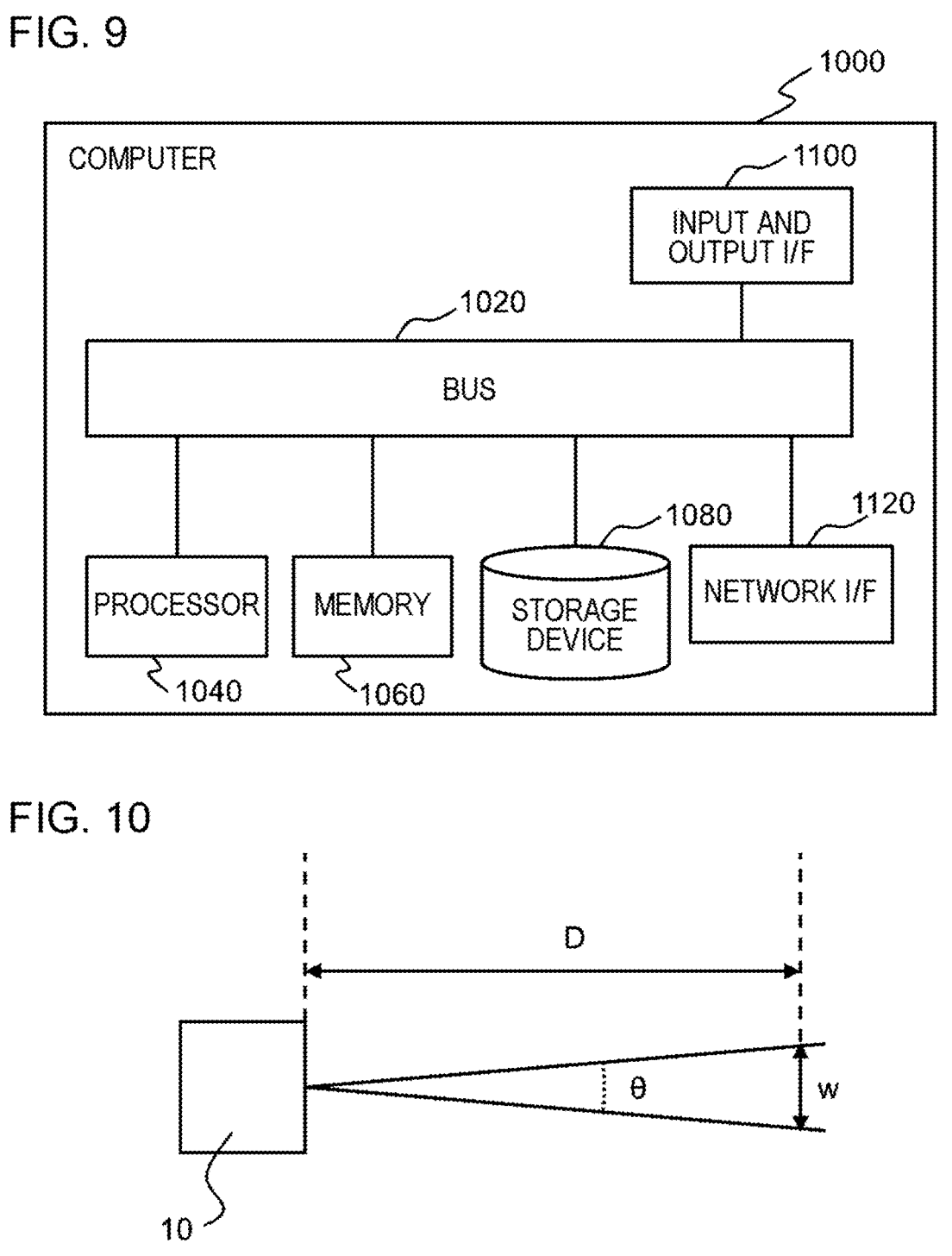

FIG. 9 is a diagram illustrating a computer 1000 for implementing the information processing apparatus 20. The computer 1000 is any computer. For example, the computer 1000 is a system-on-chip (SoC), a personal computer (PC), a server machine, a tablet terminal, a smartphone, or the like. The computer 1000 may be a dedicated computer designed to implement the information processing apparatus 20 or may be a general-purpose computer.

The computer 1000 includes a bus 1020, a processor 1040, a memory 1060, a storage device 1080, an input and output interface 1100, and a network interface 1120. The bus 1020 is a data transmission path for the processor 1040, the memory 1060, the storage device 1080, the input and output interface 1100, and the network interface 1120 to transmit and receive data to and from each other. However, a method of mutually connecting the processor 1040 and the like is not limited to bus connection. The processor 1040 may be any of various processors such as a central processing unit (CPU), a graphics processing unit (GPU), and a field-programmable gate array (FPGA). The memory 1060 is a main storage device implemented using a random access memory (RAM) or the like. The storage device 1080 is an auxiliary storage device implemented using a hard disk, a solid state drive (SSD), a memory card, a read only memory (ROM), or the like.

The input and output interface 1100 is an interface for connecting the computer 1000 to input and output apparatuses. For example, an input apparatus, such as a keyboard, or an output apparatus, such as a display apparatus, is connected to the input and output interface 1100. Further, in the present embodiment, the distance measuring apparatus 10 may be connected to the input and output interface 1100.

The network interface 1120 is an interface for connecting the computer 1000 to a network. The communication network is, for example, a local area network (LAN) or a wide area network (WAN). A method for the connection of the network interface 1120 to the network may be a wireless connection or a wired connection.

The storage device 1080 stores a program module that implements each functional configuration unit of the information processing apparatus 20. The processor 1040 reads out and executes each of these program modules on the memory 1060, thereby implementing the function corresponding to each program module.

Returning to FIG. 2, processing performed by the information processing apparatus 20 will be described. The information processing apparatus 20 acquires the point cloud data from, for example, the distance measuring apparatus 10. However, the information processing apparatus 20 may read out and acquire the point cloud data held in a storage device accessible by the information processing apparatus 20. The point cloud data includes the position information indicating the positions of the plurality of data points in a three-dimensional space. Each data point corresponds to each measurement point of the distance measuring apparatus 10. The position information may be three-dimensional Cartesian coordinates or three-dimensional polar coordinates. The origin of the three-dimensional coordinates of the position information may be a fiducial point or a point other than the fiducial point. In a case where the origin of the three-dimensional coordinates of the position information is a point other than the fiducial point, the information processing apparatus 20 acquires information indicating the position (coordinates) of the fiducial point in the three-dimensional coordinates from the distance measuring apparatus 10, or from the storage device accessible by the information processing apparatus 20. Further, the distance measuring apparatus 10 may generate the point cloud data including information indicating the position of the fiducial point. The information processing apparatus 20 may acquire the point cloud data including information indicating the position of the fiducial point.

As described above, the information processing apparatus 20 includes the generation unit 210. The generation unit 210 generates the display data of the point cloud data including the position information of the plurality of data points. The display data is data for displaying an image in which the plurality of data points included in the point cloud data are indicated by the plurality of marks. One mark in the image corresponds to one data point. Specifically, the generation unit 210 performs the following processing. The generation unit 210 calculates the distance of each data point included in the point cloud data from the fiducial point. That is, the generation unit 210 calculates the distance of each data point based on the position information of the data point and the position information of the fiducial point, for each of the data points. In a case where the origin of the three-dimensional coordinates of the position information is the fiducial point, the generation unit 210 can set the distance from the origin to the data point as the distance from the fiducial point to the data point.

Next, the generation unit 210 determines the display size of the mark indicating the data point in the display data based on the calculated distance. For example, a storage unit 220 accessible by the generation unit 210 holds in advance size information indicating the relationship between the distance and the display size. In the example of FIG. 2, the storage unit 220 is provided in the information processing apparatus 20. The size information is, for example, a table or an equation indicating the relationship between the distance and the display size. The generation unit 210 reads out and acquires the size information from the storage unit 220. Then, the display size corresponding to the calculated distance is derived using the size information. According to the size information, the longer the distance from the fiducial point to the data point is, the larger the display size of the data point is.

Here, the generation unit 210 can determine the display size of each data point further based on the spread angle θ of the pulsed light from the distance measuring apparatus 10.

FIG. 10 is a diagram showing a relationship between the spread angle θ of pulsed light, a distance D, and a spot size w of the pulsed light. As shown in this diagram, the spot size w of the pulsed light increases as the distance D from the distance measuring apparatus 10, that is, the distance D from the fiducial point increases. Specifically, w=2D×tan(θ/2) is satisfied.

The information processing apparatus 20 can acquire spread angle information indicating the spread angle θ of the pulsed light of the distance measuring apparatus 10 from the distance measuring apparatus 10. Alternatively, the distance measuring apparatus 10 may generate the point cloud data including the spread angle information, and the information processing apparatus 20 may acquire the spread angle information by acquiring the point cloud data. Alternatively, a user of the information processing apparatus 20 may input the spread angle information to the information processing apparatus 20, and the information processing apparatus 20 may acquire the spread angle information by receiving the input.

For example, in a case where the size information is a table, the storage unit 220 holds the size information corresponding to each of a plurality of spread angles θ. The generation unit 210 acquires the size information corresponding to the spread angle θ indicated by the acquired spread angle information from a plurality of pieces of size information held in the storage unit 220. Then, the display size is derived using the acquired size information, as described above.

In a case where the size information is an equation, the equation includes θ as a variable. The generation unit 210 derives the display size by substituting the spread angle θ indicated by the acquired spread angle information and the calculated distance into the equation. The size information is, for example, an equation represented by w=2D×tan(θ/2).

In addition, the generation unit 210 determines the display positions of the plurality of data points based on the position information. That is, the generation unit 210 generates the display data in which marks of the plurality of data points are disposed in accordance with the position information of each data point.

Returning to FIG. 2, a camera 30 is provided near the distance measuring apparatus 10. The imaging region to be captured by the camera 30 includes the scanning range 170 of the distance measuring apparatus 10. The information processing apparatus 20 acquires an image obtained by the camera 30 from the camera 30. The generation unit 210 generates the display data for superimposing and displaying the image captured by the camera 30 and the plurality of data points. The positional relationship between the image obtained by the camera 30 and the coordinates of the point cloud data is determined in advance, and the generation unit 210 can superimpose the image captured by the camera 30 and the plurality of data points based on the positional relationship. The image obtained by the camera 30 includes an object indicating a reference point, and the generation unit 210 may superimpose the image captured by the camera 30 and the plurality of data points such that the reference point is positioned at a predetermined coordinate position.

Here, the camera 30 is a visible light camera. In a case where the pulsed light emitted from the distance measuring apparatus 10 is infrared light, an infrared camera is required to directly image the reflection situation of the pulsed light on the object. Meanwhile, with the information processing apparatus 20 according to the present embodiment, it is possible to confirm the situation in a similar sense to directly viewing the reflective region by superimposing and displaying, on the image obtained by the visible light camera, the data point of the point cloud data with a mark emulated to the actual irradiation region.

Figure 11:
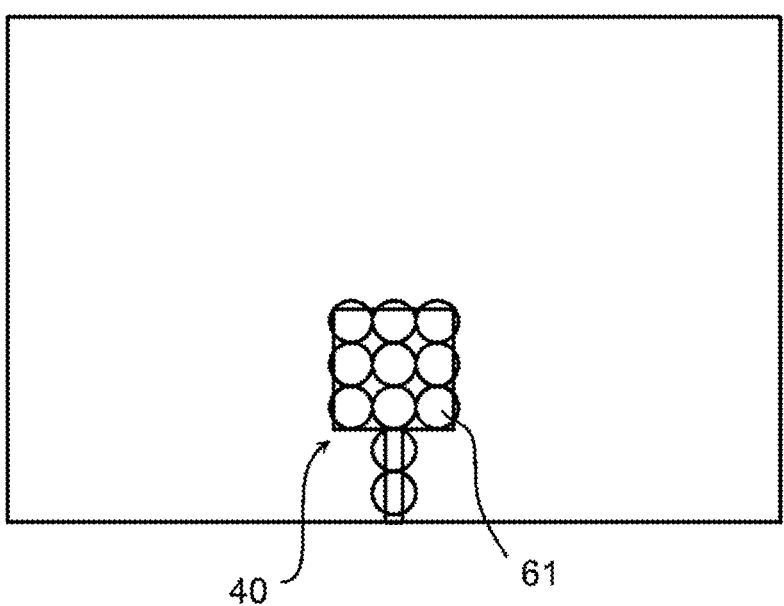
FIG. 11 is a diagram illustrating an image in which an image captured by a camera and a plurality of data points are superimposed and displayed.

FIG. 11 is a diagram illustrating an image in which the image captured by the camera 30 and the plurality of data points are superimposed and displayed. The image shows the target 40 and the marks 61 indicating the data points obtained by measuring the target 40. With such an image, it is possible to easily grasp how the pulsed light is emitted to the object located within the actual space.

The shape of the mark is not particularly limited and may be a circle, a quadrangle, other polygons, a cross mark, an X mark, or the like. Among them, it is preferable that the generation unit 210 generates the display data for displaying each data point by emulating the shape and the size of the actual irradiation region of the pulsed light from the distance measuring apparatus 10. That is, the generation unit 210 preferably sets the display shapes of the plurality of data points to be each similar in shape to the shape of the pulsed light.

Figure 12:
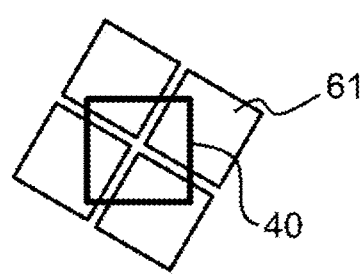
FIG. 12 is a diagram showing an example of an image displayed using display data generated by a generation unit.
Figure 12:
Figure 12:
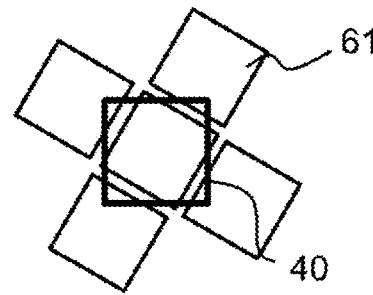
Figure 12:
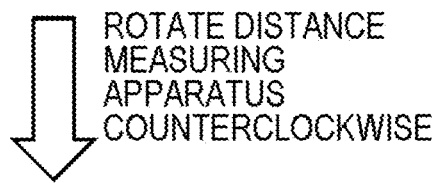
Figure 12:

FIG. 12 is a diagram showing an example of an image displayed using the display data generated by the generation unit 210. The image of the target 40 is displayed in conformity with the plurality of marks 61 indicating the data points. In this example, it is assumed that the pulsed light emitted by the distance measuring apparatus 10 is quadrangle. In the image of this diagram, the quadrangle mark 61 is displayed, similar to the pulsed light. The mark 61 is similar in shape to the shape of the pulsed light. Similar to the example shown in FIG. 8, the situation shown in the middle part of this diagram is obtained by shifting the distance measuring apparatus 10 to the upper right from the situation shown in the upper part of this diagram. Furthermore, by rotating the distance measuring apparatus 10 counterclockwise, the situation shown in the lower part of this diagram is obtained. Since the mark 61 is similar in shape to the shape of the pulsed light, the actual irradiation region of the pulsed light can be grasped intuitively, and adjustment including the attachment angle of the distance measuring apparatus 10 can be easily performed.

Figure 13:
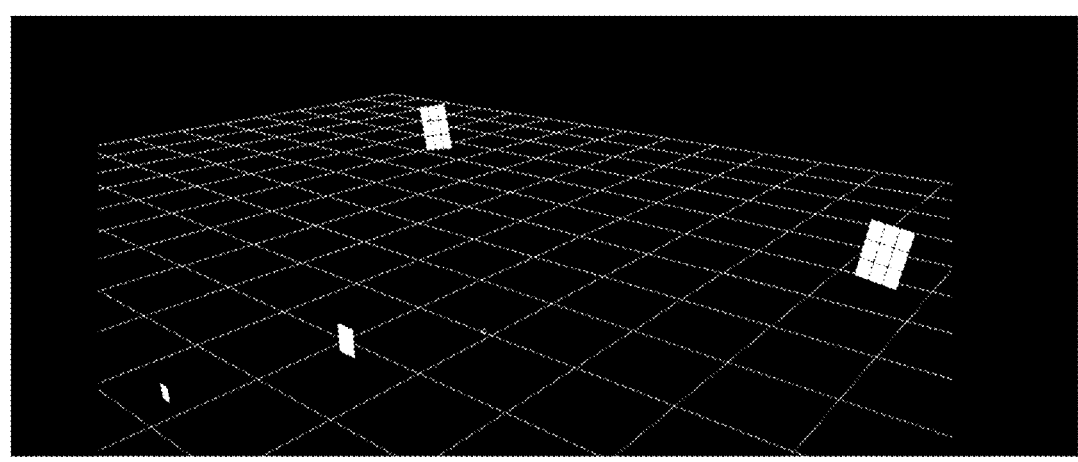
FIG. 13 is a diagram showing an example of the image displayed using the display data generated by the generation unit.

FIG. 13 is a diagram showing an example of the image displayed using the display data generated by the generation unit 210. In this diagram, the position of the distance measuring apparatus 10 that has acquired this point cloud data is located at the lower left of the diagram. In the example of this diagram, the display size of the data point increases as the distance from the distance measuring apparatus 10 increases. Furthermore, the shape of the mark is a quadrangle similar to the spot shape of the pulsed light of the distance measuring apparatus 10. Therefore, it is easy to intuitively grasp the image of the object measured by the distance measuring apparatus 10.

The information processing apparatus 20 can acquire shape information indicating the shape of the pulsed light of the distance measuring apparatus 10 from the distance measuring apparatus 10. Alternatively, the distance measuring apparatus 10 may generate the point cloud data including the shape information, and the information processing apparatus 20 may acquire the shape information by acquiring the point cloud data. Alternatively, the user of the information processing apparatus 20 may input the shape information to the information processing apparatus 20, and the information processing apparatus 20 may acquire the shape information by receiving the input. The generation unit 210 generates the display data such that the mark is displayed in the shape indicated by the shape information. The information processing apparatus 20 may be able to switch the shape of the mark according to the user's input.

In the image displayed using the display data, the mark may be displayed with only a contour line, or may be displayed with a figure filled with a predetermined color. In addition, the mark may be indicated by a color indicating the intensity of the reflected light received by the light receiving element 18. However, in a case where the mark is superimposed and displayed on the image captured by the camera 30, the mark preferably has transparency such that the image remains somewhat visible.

Figure 14:
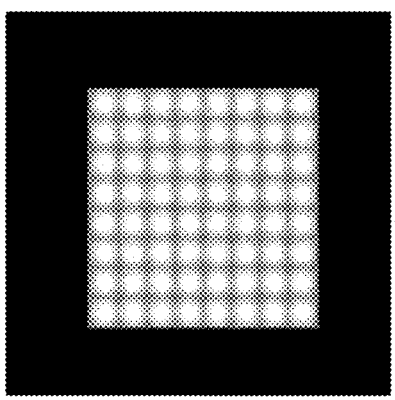
FIG. 14 is a diagram illustrating an image in which the data points are displayed with display marks each having lower transparency toward a center.

The generation unit 210 may generate the display data for displaying the plurality of data points with display marks (marks) each having lower transparency toward the center. FIG. 14 is a diagram illustrating an image in which the data points are displayed with display marks each having lower transparency toward the center. In this way, by providing a gradation in the transparency of the mark superimposed on the image captured by the camera 30, it is possible to reproduce the actual brightness distribution of the pulsed light.

The generation unit 210 outputs the generated display data. For example, the information processing apparatus 20 can output the display data to a display apparatus 22 and display the image on the display apparatus 22. The information processing apparatus 20 may hold the display data in the storage device accessible by the information processing apparatus 20.

For example, each time the distance measuring apparatus 10 generates the point cloud data, the generation unit 210 generates the display data using the point cloud data. Then, each time the display data is generated, the image displayed on the display apparatus 22 is updated with the latest display data. The user can perform adjustment work for the position and the angle of the distance measuring apparatus 10 while viewing the displayed image. The acquisition of the spread angle information and the acquisition of the shape information described above need only be performed once at the beginning, and need not be performed each time the display data is generated.

In the information processing apparatus 20, a first display mode in which the display data for displaying each of the data points in a display size determined based on the position information of the data point is generated and a second display mode in which the display data for displaying the plurality of data points in the same display size is generated may be switchable. The selection of the display mode is performed by the user of the information processing apparatus 20. The information processing apparatus 20 receives a display mode selection operation by the user. Then, display data corresponding to the selected display mode is output. In the first display mode, the generation unit 210 determines the display size of each data point using at least the size information and the calculated distance from the fiducial point described above. Then, the display data in which the marker is displayed in the determined display size is generated and output. Meanwhile, in the second display mode, the generation unit 210 generates and outputs display data for displaying all the data points in a predetermined size.

Figure 15:
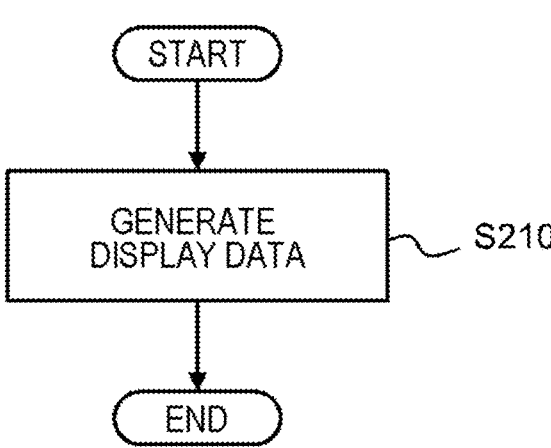
FIG. 15 is a flowchart illustrating a flow of an information processing method performed by the information processing apparatus according to the embodiment.

FIG. 15 is a flowchart illustrating the flow of an information processing method performed by the information processing apparatus 20 according to the present embodiment. The information processing method according to the present embodiment includes a generation step S210. In the generation step S210, the display data of the point cloud data including the position information of the plurality of data points is generated. In addition, in the generation step S210, the display size of the data point is determined to be increased as a distance from the fiducial point to the data point becomes longer.

As described above, according to the present embodiment, the generation unit 210 determines the display size of the data point to be increased as the distance from the fiducial point to the data point becomes longer. Therefore, the point cloud data can be displayed to facilitate grasping of how the light from the distance measuring apparatus is irradiated.

Although the embodiments and the examples have been described above with reference to the drawings, these are examples of the present invention, and various configurations other than the above can also be employed.

This application claims priority on the basis of Japanese Patent Application No. 2021-042241 filed on Mar. 16, 2021, the entire disclosure of which is incorporated herein by reference.

REFERENCE SIGNS LIST

10 distance measuring apparatus
14 light emitting element
17 measurement control unit
18 light receiving element
20 information processing apparatus
30 camera
40 target
42 attachment target object
51 light irradiation region
52 non-reflective region
170 scanning range
210 generation unit
220 storage unit
1000 computer

The invention claimed is:

1. An information processing apparatus comprising:
at least one memory configured to store instructions; and
at least one processor configured to execute the instructions to perform operations comprising:
generating display data of point cloud data including position information of a plurality of data points, the display data being data for displaying each of the plurality of data points with a mark; and
determining, by the at least one processor, a display size of the mark for each of the plurality of data points, wherein the determining the display size of the mark comprises:

making the mark for a data point larger as a distance from a fiducial point to the data point becomes longer, the fiducial point indicating a position of a distance measuring apparatus that emits pulsed light, the data point being included in the plurality of data points;

emulating a size of an actual irradiation region of the pulsed light from the distance measuring apparatus;

calculating the distance from the fiducial point to the data point;

calculating the display size using an equation $w=2D\times\tan(\theta/2)$, where w is the display size, D is the distance from the fiducial point to the data point, and $\theta$ is a spread angle of the pulsed light from the distance measuring apparatus; and deriving the display size corresponding to the calculated distance by using a size information, the size information being the equation indicating a relationship between the distance and the display size.

2. The information processing apparatus according to claim 1, wherein generating the display data comprises determining the display size of each of the data points further based on the spread angle of the pulsed light from the distance measuring apparatus.

3. The information processing apparatus according to claim 1, wherein, in the generation of the display data, the processor is configured to set display shapes of the plurality of data points to be each similar in shape to a shape of the pulsed light.

4. The information processing apparatus according to claim 1, wherein generating the display data comprises generating the display data for superimposing and displaying an image captured by a camera and the plurality of data points.

5. The information processing apparatus according to claim 1, wherein generating the display data comprises generating the display data for displaying the plurality of data points with display marks each having lower transparency toward a center.

6. The information processing apparatus according to claim 1, wherein a first display mode in which the display data for displaying each of the data points in a display size determined based on the position information of the data point is generated and a second display mode in which the display data for displaying the plurality of data points in same display size is generated are switchable.

7. The information processing apparatus according to claim 1, wherein generating the display data comprises determining display positions of the plurality of data points based on the position information.

8. An information processing method executed by a processor of a computer, the information processing method comprising:

generating display data of point cloud data including position information of a plurality of data points, the display data being data for displaying each of the plurality of data points with a mark; and determining, by the processor, a display size of the mark for each of the plurality of data points, wherein the determining the display size of the mark comprises:

making the mark for a data point larger as a distance from a fiducial point to the data point becomes longer, the fiducial point indicating a position of a distance measuring apparatus that emits pulsed light, the data point being included in the plurality of data points;

emulating a size of an actual irradiation region of the pulsed light from the distance measuring apparatus;

calculating the distance from the fiducial point to the data point;

calculating the display size using an equation $w=2D\times\tan(\theta/2)$, where w is the display size, D is the distance from the fiducial point to the data point, and $\theta$ is a spread angle of the pulsed light from the distance measuring apparatus; and deriving the display size corresponding to the calculated distance by using a size information, the size information being the equation indicating a relationship between the distance and the display size.

9. A non-transitory storage medium storing a program causing a processor of a computer to execute an information processing method, the information processing method comprising:

generating display data of point cloud data including position information of a plurality of data points, the display data being data for displaying each of the plurality of data points with a mark; and determining, by the processor, a display size of the mark for each of the plurality of data points, wherein the determining the display size of the mark comprises:

making the mark for a data point larger as a distance from a fiducial point to the data point becomes longer, the fiducial point indicating a position of a distance measuring apparatus that emits pulsed light, the data point being included in the plurality of data points;

emulating a size of an actual irradiation region of the pulsed light from the distance measuring apparatus;

calculating the distance from the fiducial point to the data point;

calculating the display size using an equation $w=2D\times\tan(\theta/2)$, where w is the display size, D is the distance from the fiducial point to the data point, and $\theta$ is a spread angle of the pulsed light from the distance measuring apparatus; and deriving the display size corresponding to the calculated distance by using a size information, the size information being the equation indicating a relationship between the distance and the display size.

10. The information processing apparatus according to claim 1, wherein the operations further comprise outputting the generated display data to a display device to display an image.

11. The information processing apparatus according to claim 1, wherein the operations further comprise:

updating an image displayed on a display apparatus with the generated display data each time the distance measuring apparatus generates the point cloud data.

12. The information processing apparatus according to claim 1, wherein the pulsed light is infrared light, and wherein generating the display data comprises generating the display data for superimposing and displaying, on an image obtained by a visible light camera, the plurality of data points with marks emulated to actual irradiation regions of the pulsed light.

13. The information processing apparatus according to claim 1, wherein a display area size of the mark corresponds to the size of the actual irradiation region of the pulsed light, such that a size of a gap between marks corresponds to a size of an actual gap between light irradiation regions of the pulsed light.

14. The information processing apparatus according to claim 1, wherein the distance measuring apparatus is mounted in a moving object, and wherein the display data is for use in adjustment work of an attachment position and an attachment angle of the distance measuring apparatus with respect to the moving object using a target disposed at a predetermined position.

15. The information processing apparatus according to claim 1, wherein the operations further comprise:

acquiring the point cloud data from the distance measuring apparatus; and updating an image displayed on a display apparatus with the generated display data each time the distance measuring apparatus generates the point cloud data.

16. The information processing apparatus according to claim 1, wherein the operations further comprise acquiring spread angle information indicating the spread angle of the pulsed light from the distance measuring apparatus, and wherein the determining the display size of the mark is further based on the spread angle indicated by the acquired spread angle information.

* * * * *